US010909954B2

(12) United States Patent
Klosowiak

(10) Patent No.: US 10,909,954 B2
(45) Date of Patent: Feb. 2, 2021

(54) SYSTEMS AND METHODS FOR IMPROVED COMPOSITE SOUND BOARD

(71) Applicant: KLOS INNOVATIONS, LLC, Provo, UT (US)

(72) Inventor: Ian Klosowiak, Provo, UT (US)

( * ) Notice: Subject to any disclaimer, the term of this patent is extended or adjusted under 35 U.S.C. 154(b) by 0 days.

(21) Appl. No.: 16/572,492

(22) Filed: Sep. 16, 2019

(65) Prior Publication Data

US 2020/0111457 A1 Apr. 9, 2020

Related U.S. Application Data

(60) Provisional application No. 62/731,975, filed on Sep. 17, 2019.

(51) Int. Cl.

| G10D 3/02 | (2006.01) |
|---|---|
| B32B 5/02 | (2006.01) |
| B32B 5/18 | (2006.01) |
| B32B 5/24 | (2006.01) |
| B32B 9/04 | (2006.01) |
| G10D 1/08 | (2006.01) |
| B32B 9/02 | (2006.01) |
| G10D 3/22 | (2020.01) |

(52) U.S. Cl.
CPC .............. *G10D 3/02* (2013.01); *B32B 5/024* (2013.01); *B32B 5/18* (2013.01); *B32B 5/245* (2013.01); *B32B 9/02* (2013.01); *B32B 9/047* (2013.01); *G10D 1/08* (2013.01); *G10D 3/22* (2020.02); *B32B 2262/106* (2013.01)

(58) Field of Classification Search
CPC ... G10D 3/02; G10D 3/22; G10D 1/08; B32B 9/02; B32B 9/047; B32B 5/245; B32B 5/18; B32B 5/024; B32B 2262/106
See application file for complete search history.

(56) References Cited

U.S. PATENT DOCUMENTS

| 7,276,868 B2 * | 10/2007 | Allred, III | ............... G10D 3/02 |
|---|---|---|---|
| | | | 318/294 |
| 2014/0144306 A1 * | 5/2014 | Seal | ......................... G10D 3/04 |
| | | | 84/291 |
| 2018/0117884 A1 * | 5/2018 | Luttwak | .................... G10D 1/08 |

* cited by examiner

*Primary Examiner* — Kimberly R Lockett
(74) *Attorney, Agent, or Firm* — Dax D. Anderson; Kirton McConkie

(57) ABSTRACT

A carbon fiber sound board is disclosed with breaks in the fibers to improve the sound quality and timber of the carbon fiber instrument.

19 Claims, 3 Drawing Sheets

SYSTEMS AND METHODS FOR IMPROVED COMPOSITE SOUND BOARD

TECHNICAL FIELD

The present disclosure relates generally to systems and methods for an improved carbon fiber sound board in a stringed instrument such as an acoustic guitar.

BACKGROUND

The first historical evidence of a stringed instruments is found on tombs in ancient Egypt. Throughout history and into the present day stringed musical instruments continue to be popular. In the United States artists have used the guitar. Acoustic guitars are particularly popular in genres including Country, Folk, bluegrass and the like.

Acoustic instruments are widely used and admired because of their rich sound created by vibrating strings vibrating air in the resonating chamber. Guitars are played primarily by plucking or strumming. Other instruments, such as the violin, viola, cello and bass use a bow to create different sound based on similar technology. Even a piano operates by a vibrating string combined with a sound board.

Many traditions have arisen through time centered on musical instruments. From religious ceremonies to romanticized campfire sing-a-longs, accompanied vocals play an important part in society. As a result, musicians often want to bring their instruments on their travels. Guitar enthusiasts as well as professionals take their guitars wherever they go. Social media allows people to share talents and make more connections with people from around the world. When musicians make social media connections travel often is centered around traveling to meet new friends to enjoy music together. In addition, with the improved mobility of electronics people have come to expect improved mobility in their other aspects of their lives including musical instruments.

Traditional methods of improving a guitar's timber, especially in travel instruments, include adding material, usually by gluing material to the sound board to change its vibrational harmonics. The guitar is a mobile instrument and as a result, the weight of a guitar is important. Whether traveling or performing a lighter guitar gives advantages over heavier models. To achieve these objectives carbon fiber is used as a primary structural element of the sound board and body. However, carbon fiber has different properties from wood. Moreover, replacing natural woods with carbon fiber materially changes the guitar's timbre. This is in part the result of the carbon fiber's structural properties, as well as manufacturing techniques. As a result, a modified sound board is needed to improve the timber of a guitar made from carbon fiber.

BRIEF SUMMARY

The general purpose of the systems and methods disclosed herein is to provide an improved composite sound board. Specifically, a sound board is disclosed wherein the fibrous materials in the sound board are intermittently interrupted to improve the timbre of sound board.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 shows a close-up view of the float lines.

DETAILED DESCRIPTION OF THE INVENTION

Figure 1:
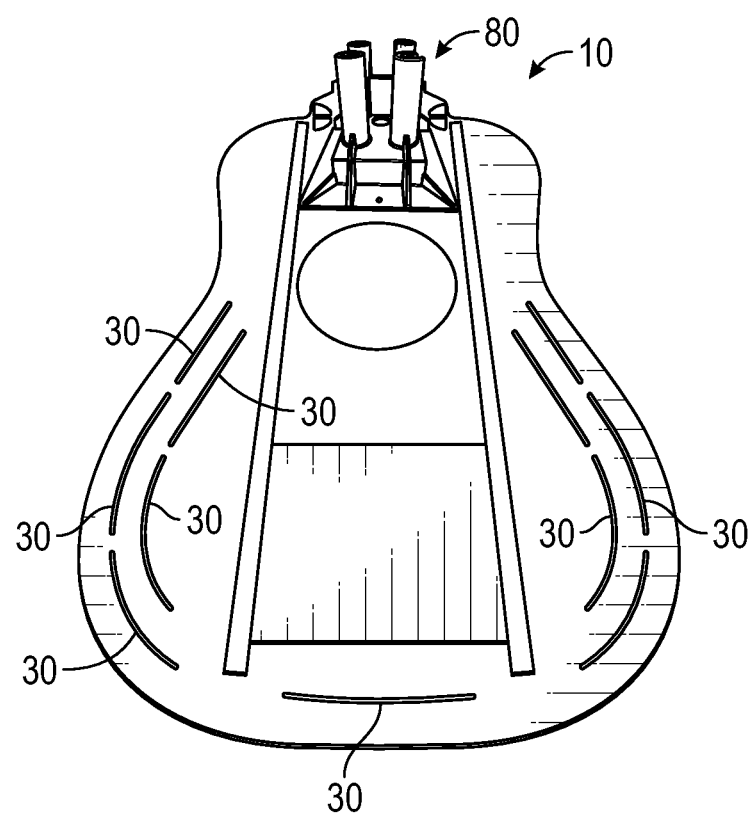
FIG. 1 shows a perspective view of a soundboard with a neck block.
Figure 2A:
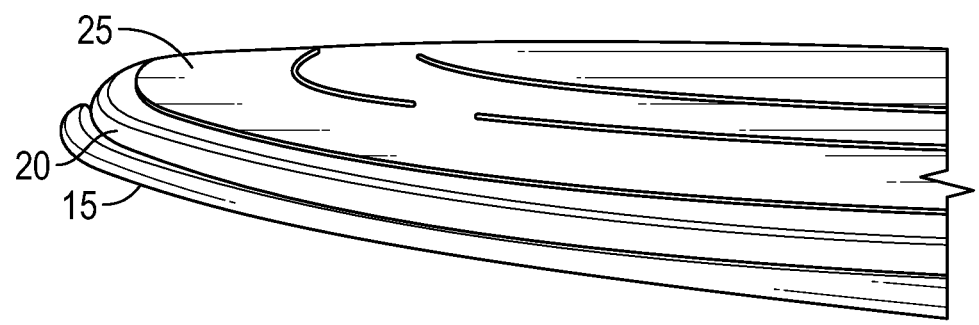
FIG. 2 shows a close-up view of the layers of the sound board.
Figure 2B:
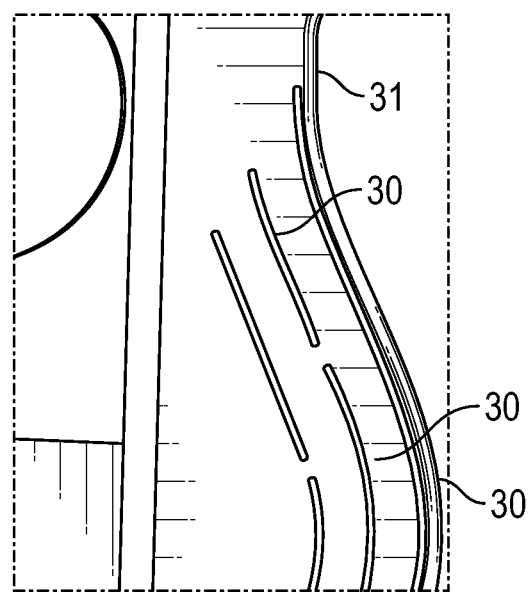
Figure 3A:
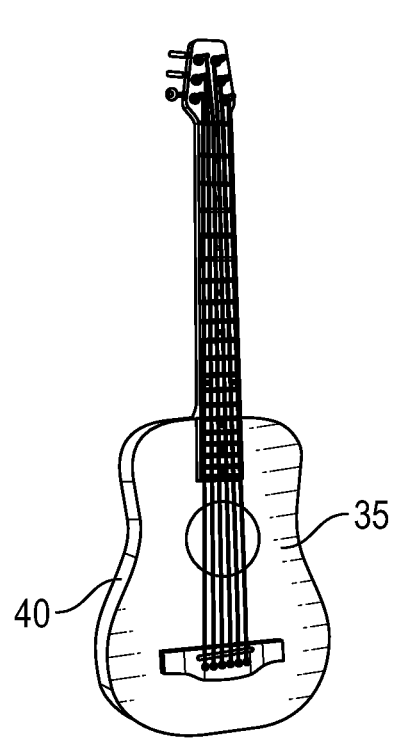
FIG. 3A shows the front of a stringed instrument with a resonance chamber.
Figure 3B:
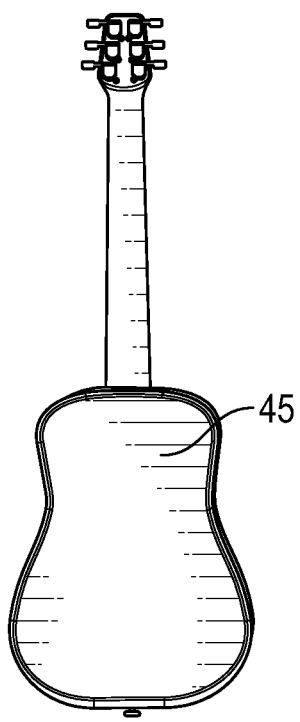
FIG. 3B shows the back of a stringed instrument with a resonance chamber.
Figure 3C:
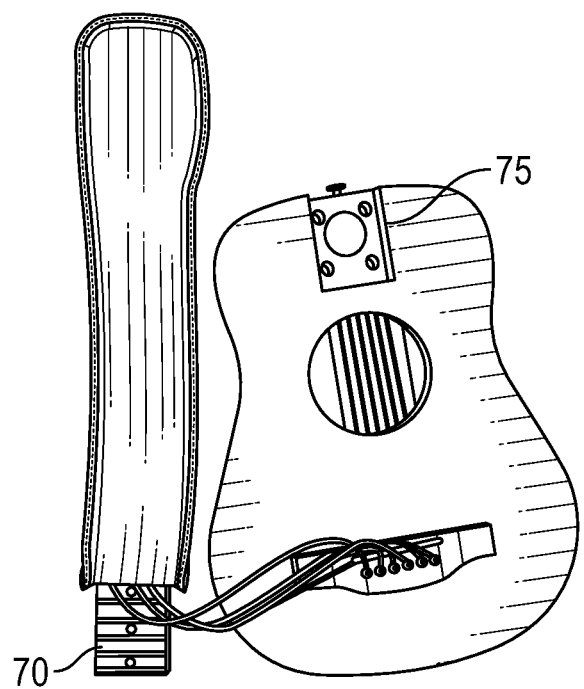
FIG. 3C shows the plan view of a disassembled guitar.

The embodiments of the sound board will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed descriptions of the embodiments of the apparatus, as represented in FIGS. 1-3C are not intended to limit the scope of the invention, as claimed, but are merely representative of alternative embodiments of the invention.

In general, a composite sound board 10 is disclosed comprising a first layer 15 of fibrous material, a middle layer 20 of material different from the first and a second layer 25 of fibrous material wherein the fibers of the second layer 25 are intermittently interrupted by float lines 30. In certain embodiments the first layer 15 of fibrous material is carbon fiber. Alternatively the first layer 15 may comprise fibers such as wood or other plant-based fibers, ceramic fibers such as glass or metal fibers.

In certain embodiments the middle layer 20 is a different material from the first layer 15 and may comprise a polymeric material such as a foam. In alternative embodiments the middle layer 20 comprises a natural material such as cork or other vibrational dampening materials.

In certain embodiments the second layer 25 comprises a material different from the middle layer 20 and may comprise the same material as the first, or it may be a different material. In certain embodiments, where the first layer 15 and the second layer 25 are made from the same material, such as carbon fiber, the sound board 10 timbre may be improved by float lines 30 which are intermittent interruptions to the fibers in the second layer 25. This intermittent interrupting may comprise cutting material out of the second layer 25. In certain alternative embodiments the intermittent interruptions may comprise using a weave of carbon fiber wherein certain directional weaves are not included.

In certain embodiments the composite sound board 10 further is incorporated into a resonance chamber comprising a side wall 40 and a back 45 wherein the first layer 15 of fibrous material is in contact with the side 40 of the resonance chamber and wherein at least a portion of the second layer 25 of fibrous material is not in contact with the side 40 of the resonance chamber.

In certain embodiments the top layer of the sound board 10 is connected to a side of resonance chamber to enclose the chamber while the middle layer 20 and second layer 25 are not connected to the side 40 of the resonance chamber. However, in certain embodiments where the middle layer 20 and second fiber layer are not connected to the side, the top layer acts as a hinge, reducing the stiffness of the sound board 10 and allowing the sound board 10 to vibrate at a greater amplitude. In certain embodiments the float lines 30 of the sound board 10 are formed by a router cutting and removing material from the second layer 25.

In certain embodiments a plurality of float lines 30 or intermittent fiber interruptions are curved cuts in the second layer 25 which follow the contours of the outer edge of the second layer 25. Alternatively, in some embodiments the intermittent interruptions are straight lines. The selection of the technique is the result of several factors. Aesthetically intermittent interruption of the fibers in the second layer 25 are visible on the front 35 of the resonance chamber if they are not done carefully. Wide cuts can be are more visible than narrow cuts. Similarly long straight cuts may be more visible on the front 35 of the resonance chamber than short narrow cuts. In certain embodiments, long curved cuts are cut into the second layer 25 using a router. These intermittent interruptions are called float lines 30.

In certain embodiments the sound board 10 further comprises a notch 75 at one end of the sound board 10 configured to receive a selectively removable neck 70. In some embodiments the notch 75 is through all three layers of the sound board 10. In certain embodiments a neck block 80 configured to receive a selectively removable neck 70, the neck block 80 further comprising a plurality of spacer members extend away from the sound board 10, is connected to the sound board 10. The neck block 80 is positioned on the sound board via a pin extending from the neck surface that mates with the sound board and is inserted into a receiving hole. In addition neck block is aligned with the notch in the sound board. The neck is secured in placed by glue. Alternative embodiments may secure the neck block 80 in place friction, between the body and the sound board 10, and further secured in place by the screws used to secure a neck to a body.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A composite sound board comprising:
a first layer of fibrous material;
a middle layer of material different from the first;
a second layer of fibrous material wherein the second layer further comprises float lines; and
the composite sound board further comprising a side of a resonance chamber comprising a side wall and a back wherein the first layer of fibrous material is in contact with the side of the resonance chamber and wherein at least a portion of the second layer of fibrous material is not in contact with the side of the resonance chamber.

2. The first layer of fibrous material of claim 1 wherein the material is carbon fiber.

3. The second layer of fibrous material wherein the material is carbon fiber.

4. The float line of claim 1 wherein the float line is formed on the distal edge of the sound board.

5. The second layer of claim 1 wherein a portion of material is removed.

6. The second layer of claim 1 wherein the fibrous material is manufactured with interruptions to the fibers.

7. The second layer of claim 1 wherein the second layer is carbon fiber and the carbon fiber is woven with gaps to provide the intermittent interruptions to the fibers.

8. The second layer of claim 6 wherein the intermittent interruptions are cuts in the second layer.

9. The second layer of claim 6 wherein the intermittent interruptions are curved cuts in the second layer which follow the contours of the outer edge of the second layer.

10. The sound board of claim 1 further comprising a notch configured to receive a selectively removable neck.

11. The sound board of claim 1 further comprising a neck block the neck block further comprising a plurality of support members extending away from the sound board, the neck block configured to receive a selectively removable neck.

12. A resonance chamber comprising:
a composite sound board comprising a first layer of fibrous material;
a middle layer of material different from the first;
a second layer of fibrous material wherein the second layer further comprises float lines and wherein the fibers forming the second layer comprise intermittent interruptions and wherein the first layer of fibrous material is in contact with the side of the resonance chamber, wherein at least a portion of the second layer of fibrous material is not in contact with the side of the resonance chamber, and wherein the composite sound board forms a wall of the resonance chamber.

13. The second layer of claim 12 wherein the fibrous material is manufactured with interruptions to the fibers.

14. The second layer of claim 12 wherein the second layer is carbon fiber and the carbon fiber is woven with gaps to provide the intermittent interruptions to the fibers.

15. The second layer of claim 13 wherein the intermittent interruptions are cuts in the second layer.

16. The second layer of claim 13 wherein the intermittent interruptions are curved cuts in the second layer which follow the contours of the outer edge of the second layer.

17. A resonance chamber comprising:
a composite sound board comprising a first layer of fibrous material;
a middle layer of material different from the first;
a second layer of fibrous material wherein the second layer further comprises float lines and wherein the first layer of fibrous material is in contact with the side of the resonance chamber, wherein at least a portion of the second layer of fibrous material is separated from the side of the resonance chamber, and wherein the composite sound board forms a wall of the resonance chamber.

18. The second layer of claim 17 wherein the second layer is carbon fiber and the carbon fiber is woven with gaps to provide intermittent interruptions to the fibers.

19. The second layer of claim 18 wherein the second layer is carbon fiber and the carbon fiber is cut to shorten the lengths of the fibers in the second layer.

* * * * *